(12) United States Patent
Klug et al.

(10) Patent No.: US 8,914,621 B2
(45) Date of Patent: Dec. 16, 2014

(54) PROCESSING UNIT THAT DETECTS MANIPULATIONS THEREOF, DEVICE COMPRISING TWO PROCESSING UNITS, METHOD FOR TESTING A PROCESSING UNIT AND A DEVICE COMPRISING TWO PROCESSING UNITS

(75) Inventors: Franz Klug, Aying (DE); Andreas Wenzel, Munich (DE)

(73) Assignee: Infineon Technologies AG, Neubiberg (DE)

( * ) Notice: Subject to any disclaimer, the term of this patent is extended or adjusted under 35 U.S.C. 154(b) by 662 days.

(21) Appl. No.: 12/417,172

(22) Filed: Apr. 2, 2009

(65) Prior Publication Data

US 2010/0257343 A1    Oct. 7, 2010

(51) Int. Cl.
*G06F 9/30* (2006.01)
*G06F 21/75* (2013.01)
*G06F 11/22* (2006.01)

(52) U.S. Cl.
CPC ............ *G06F 21/75* (2013.01); *G06F 11/2284* (2013.01)
USPC .......................................... 712/227; 714/36

(58) Field of Classification Search
None
See application file for complete search history.

(56) References Cited

U.S. PATENT DOCUMENTS

| 5,157,781 | A | 10/1992 | Harwood et al. | |
| 6,715,062 | B1 * | 3/2004 | Moore | 712/227 |
| 6,820,192 | B2 * | 11/2004 | Cho et al. | 712/227 |

OTHER PUBLICATIONS

German Office Action dated Oct. 10, 2012 corresponding to Application No. 10 2010 003 153.4 (with English translation).
Agrawal, et al., A tutorial on built-in self-test I. Principles', Design Test of Computers, IEEE, 10, 1993, 2, pp. 73-82. ISSN 0740-7475. URL:http://ieeexplore.ieee.org/stamp/stamp.jsp?tp=&arnumber=199807 [abgerufen am Sep. 10, 2012].
Agrawal, et al., A tutorial on built-in self-test 2. Applications', Design Test of Computers, IEEE, 10, 1993, 2, pp. 69-77. ISSN 0740-7475. URL: http://ieeexplore.ieee.org/stamp/stamp.jsp?tp=&arnumber=211530 [abgerufen am Sep. 10, 2012].
Ratiu, et al., Pseudorandom built-in self-test methodology and implementation for the IBM RISC System/6000 processor, IBM Journal of Research and Development, 34,1990, 1, p. 78-84. ISSN 0018-8646. URL:http://ieeexplore.ieee.org/stamp/stamp.jsp?tp=&arnumber=5389861 [abgerufen am May 10, 2012].
DO-178B, Wikipedia, the free encyclopedia. Bearbeitungsstand: Mar. 29, 2009. URL:http://en.wikipedia.org/w/index.php?title=DO-178B&oldid=280323160 [abgerufen am May 10, 2012].
IEC 61508, Wikipedia, the free encyclopedia. Bearbeitungsstand: Mar. 30, 2009. URL:http//de.wikipedia.org/w/index.php?title=IEC_61508&oldid=58477696 [abgerufen am Oct. 10, 2012].

* cited by examiner

*Primary Examiner* — William B Partridge
(74) *Attorney, Agent, or Firm* — Schiff Hardin LLP

(57) ABSTRACT

A processing unit having a control unit configured to execute after a reset phase a sequence of test instructions to detect a manipulation of the processing unit before the control unit decodes a first instruction for a normal operation.

21 Claims, 2 Drawing Sheets

PROCESSING UNIT THAT DETECTS MANIPULATIONS THEREOF, DEVICE COMPRISING TWO PROCESSING UNITS, METHOD FOR TESTING A PROCESSING UNIT AND A DEVICE COMPRISING TWO PROCESSING UNITS

BACKGROUND OF THE INVENTION

Embodiments of the present invention relate to processing units, for example micro-controllers.

Security controllers are threatened by a plurality of attacking scenarios. One possible kind of attack is the permanent modification of a circuit, for example via a focused ion beam (FIB). Using FIBs, it is possible to, for example, permanently connect signal paths of the security controller or any other micro-controller or processing unit to a high or low voltage, with other signal paths or to disconnect signal paths to modify the functional behavior of the processing unit. This kind of permanent modification or manipulation of the functionality of processing units can, for instance, be used for fraud in the context of payment cards, security or authentication cards, or any other misuse where third parties rely on the proper functioning of the processing unit or device, e.g. in a gas counter at a gas station, in a weighing machine, etc.

One known method for detecting such permanent manipulations is the "user mode security life control" (UmSLC). Here, the system is stopped in regular or irregular intervals and parts of the circuitry are checked using patterns specifically added to the circuitry that are conducted through the system and that are readout and checked. Such solutions require additional hardware, for example for the storage of the results. Furthermore, a considerable amount of downtime for the testing of the nodes is required, and sometimes it is even impossible to integrate such solutions.

BRIEF DESCRIPTION OF THE DRAWINGS

Embodiments are described hereinafter making reference to the appended drawings.

Equal or equivalent elements are denoted in the following description of the figures by equal or equivalent reference signs.

DETAILED DESCRIPTION OF THE INVENTION

Figure 1:
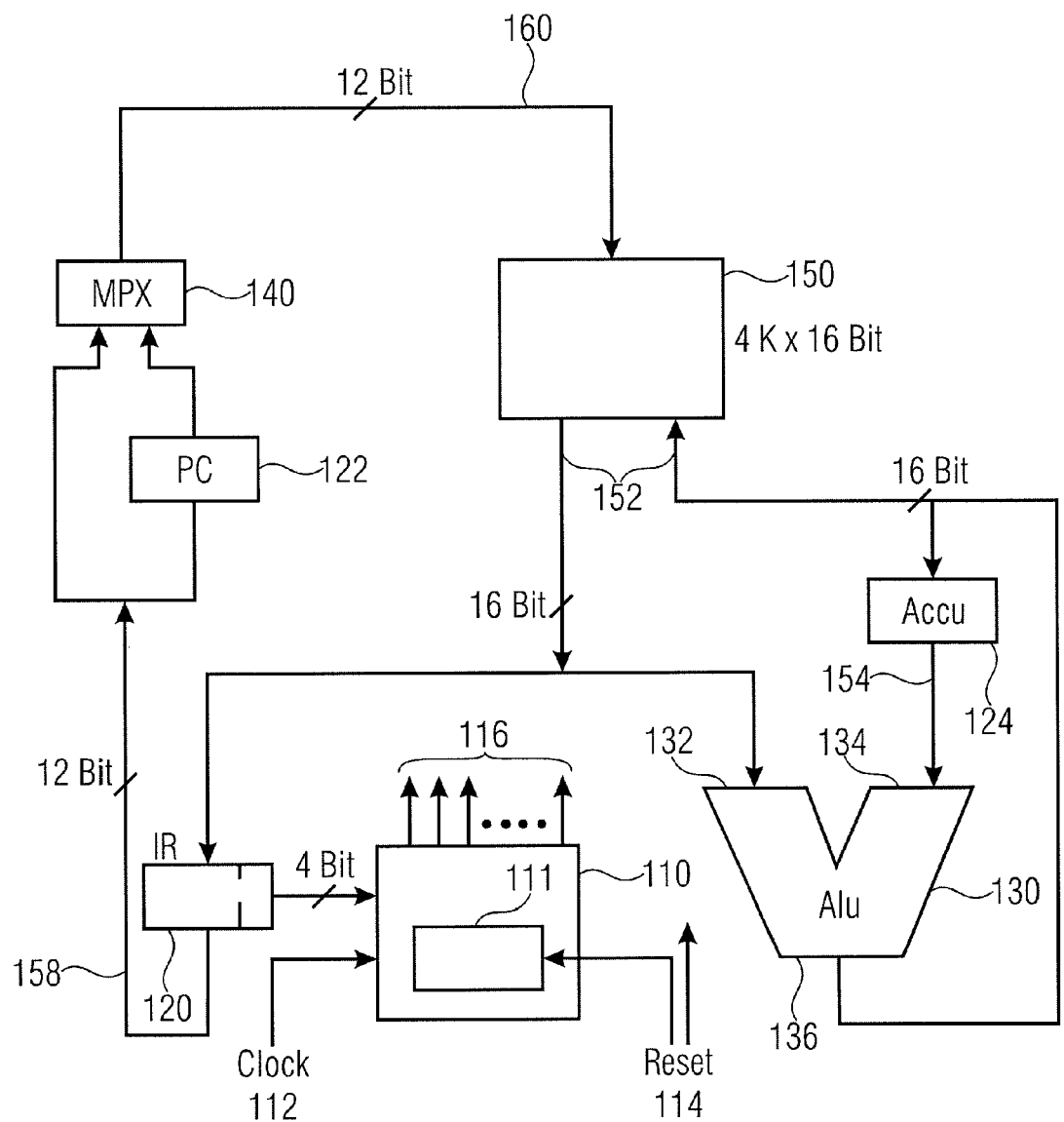
FIG. 1 shows a schematic drawing of an embodiment of a micro-controller.

FIG. 1 shows a schematic drawing of an embodiment of a micro-controller 100 connected to a main memory 150, the micro-controller 100 comprising a control unit 110, registers, namely instruction registers (IR) 120, a program counter (PC) 122, and an accumulator or accumulator register (ACCU) 124, an arithmetic logic unit (ALU) 130, and a multiplexer (MPX) 140. The main memory can be a read only memory (ROM), any type of a programmable ROM (PROM), a random access memory (RAM), or a combination of a ROM and RAM.

In the following, for a better understanding of the embodiments of the invention, the normal operation of the exemplary microcontroller is described, wherein the term "normal operation" refers to the execution of a micro-controller program stored, e.g., in the main memory 150.

The micro-controller 100 is adapted to process 16-bit instructions or data, wherein a 16-bit instruction comprises a 12-bit address field and a 4-bit operations code (Op-code) as can be seen from the instruction register (IR) 120. The operations code specifies the operation to be executed, for example, adding two numbers, branching, storing data in the main memory 150, etc. The address field is used to address data in the main memory. The main memory 150 is capable of storing 16-bit data or instructions, the data bus 152, 154 has a length or width of 16-bits and the address bus 152, 154 has a length or width of 12-bits. The first port 132 of the arithmetic logic unit 130 and the instruction register 120 are connected via a first part of the 16-bit data bus 152 to the main memory, the second port 134 of the arithmetic logic unit 130 is connected via another 16-bit bus part 154 to the accumulator 124, and the output port 136 of the arithmetic logic unit 130 is connected via a second part of the 16-bit data bus 152 to the main memory 150. The address part of the instruction register 120 is connected via a first 12-bit address bus 158 to the program counter 122 and the multiplexer 140, and the multiplexer 140 is connected via a second 12-bit address bus 160 to the main memory 150. The operations code part of the instruction register 120 is connected to the control unit 110. The control unit 110 further comprises an input port for a clock signal 112 or system clock signal 112 and an input port for a reset signal 114.

The arithmetic logic unit 136 is, for example, adapted to perform arithmetic and logic operations on operands provided via the first input port 132 and the second input port 134 and to output the result of the arithmetic or logic operation via output port 136. Arithmetic operations include, for example addition, subtraction, and may also include multiplication and division. Bit-wise logic operations include, for example, AND, NOT, OR and XOR. The arithmetic logic unit is further adapted to also perform bit-shifting operations, for example, shifting or rotating the 16-bit word stored in the arithmetic logic unit 130 by a specified number of bits to the left or right, with or without carry, and with or without sign extension. These shifts can also be interpreted as multiplications by two and divisions by two.

The accumulator 124 serves as a read or write register of the arithmetic logic unit 130. The accumulator also contains the second operand for an arithmetic or logic operation within the arithmetic logic unit. The result of the operation can either, be written back in the accumulator 124, or into the main memory 150, in case the main memory comprises a random access memory (RAM).

The instruction register 120 is used to store the instruction that is currently executed until the execution has been completed. The program counter 122 is used to address the next instruction of a program stored in the main memory. The program counter is incremented by one during the execution of an instruction and points to the next instruction of a sequential program, or can be loaded with a new address in case of branch instructions. Embodiments of the microcontroller also comprise a status register (not shown in FIG. 1), also referred to as flag register or control register. The status register is a collection of status or flag bits of a micro-controller, containing information about the current status of the micro-controller with regard to the execution of a program and/or control and status information for the arithmetic logic unit. Embodiments of the micro-controller 100 can comprise status registers with a "zero flag" indicating that the result of a mathematical or logical operation is 0, and/or a "carry flag" indicating that an operation produced a result greater than the number of available bits within the arithmetic logic unit, wherein the "carry flag" may also be set before a mathematical or logical or shifting operation as an extra operand. The registers and the accumulator may be implemented using 16 latches or flip-flops, each latch or flip-flop storing 1-bit of the respective data. The arithmetic logic unit 130 also comprises 16 storage elements, for example latches or flip-flops to temporarily store the data loaded into the arithmetic logic unit, or to store the result of an arithmetic or logic or shifting operation.

A "storage element" is any storage element, for example any volatile storage element like a latch or flip-flop for storing a bit value. Such storage elements can be implemented as single or stand alone storage elements or in combination with others as registers, such as the instruction register 120, the program counter 122, the accumulator 124, as general purpose register or as specific purpose register, such as a status register, and are used in, for example, the arithmetic logic unit. In further embodiments random access memories (RAM) and/or nonvolatile memories (NVM) can be used as "storage elements".

The multiplexer 140 is used to either, connect the program counter 122, or the address field of the instruction stored in the instruction register 120, to the address bus 160, to thus select a memory address within the main memory 150, e.g. a next instruction or a data.

FIG. 1 shows symbolically the different control signals 116 of a control bus. The control signals are generated by the control unit 110 to control the operation of the micro-controller 100, by sending control signals to the different elements of the microcontroller, e.g. the accumulator 124, the arithmetic logic unit 130, the instruction register 120, the program counter 122 and the multiplexer 140. Control signals are used, e.g., for reading data from and the writing data to the registers such as the instruction register 120, the program counter 122, and the accumulator 124, and for controlling the specific operations performed by the arithmetic logic unit 130. The control unit 110 also controls the reading of data from, and the writing of data to, the main memory 150 via the control signals 116. The 4-bit operations code allows for the coding of 16 different instructions or opcodes, wherein for each op-code a different sequence of control signals is generated for the different aforementioned elements.

The control unit 110 further comprises a clock signal 112 which effects the setting and/or resetting of the flip-flops, wherein setting a flip-flop refers to storing the logical value "1", and wherein resetting refers to storing the logical value "0" in the flip-flop. The change between these two values or states is also referred to as state transition or short "transition". Based on the clock signal, the instructions are executed, for example, in two cycles, an instruction cycle and an execution cycle. During the instruction cycle (I-cycle) the address part of the instruction register (IR) 120 or the address data stored in the program counter 122 passes the multiplexer and the 16-bit word stored at the respective address is read out from the main memory 150 and stored in the instruction register 120. During the execution cycle (E-cycle), the control unit decodes the actual operations code stored in the instruction register 120 to generate the sequence of control signals associated to the 4 bit operations code.

The control unit 110 decodes each of the operations codes to generate the operations code specific sequences of control signals 116. The execution of the sequence of control signals is clocked by the clock signal 112. The control unit generates different control signals for the different functional elements, for example 130, 140, 120, etc. Embodiments of the control unit 110 can be adapted to translate or decode the operations code hardwired, for example by using logic gates, or using micro-programs. For the latter, an internal micro-program storage is used. The micro-program storage is also referred to as control store and is integrated inside the control unit 110, instead of the logic gates. The output ports of the micro-program storage or memory (e.g. ROM, PROM), directly form the control signals 116 for the micro-controller. In other words, each micro-program memory entry comprises the respective bit combinations for the individual clock cycles and the execution of the operation codes. In contrast to the main memory, that can also be referred to as external memory with regard to the control unit, the control unit can access the micro program memory directly without using the data and/or address bus, without using the program counter PC to download the correct data or instruction from the memory and without decoding the operations code part of the instruction stored in the instruction register IR. Furthermore the size of the micro program memory is much smaller than the main memory. Nevertheless, embodiments using the hardwired decoding of the operations codes require less space than the ones based on micro-programs.

Important for the correct execution of the programs stored in the main memory 150 is the proper initialization of all functional elements, and in particular, the storage elements when starting the micro-controller, for example, after switching the power on. This initialization phase, also referred to as reset phase, is used to set the micro-processor in a predefined starting state. The reset phase is started in response to the reset signal 114, for example by activating the reset signal. During the reset phase, e.g. all storage elements including the ones of the arithmetic logic unit, of the aforementioned registers 120, 122, 124, and of further control registers, such as the status register are reset to a predefined initialization or reset value. Depending on the function or use of the storage element this initialization value can be, e.g. "0" or "1". Furthermore, the program counter 122 is loaded with the starting address of the micro-controller program stored in the main memory. The instruction at the starting address comprises the first instruction of the micro-controller program to be loaded from the main memory 150 to the instruction register 120. During the reset phase the storage elements are blocked for any other operation, in other words only the resetting to the individual reset values is performed. The reset phase ends when the reset signal is deactivated again.

After the reset phase the memory address stored in the program counter PC is used the select the corresponding address of the first instruction of the microcontroller program stored in the main memory 150 and to download the first instruction to the instruction register IR. Once the first instruction is loaded to the instruction register, the decoding of the operations code part of the first instruction is started and so forth. In other words, after the reset phase the normal operation of the processing unit starts by selecting, downloading and executing a first instruction of a sequence of instructions stored in the main memory 150.

Embodiments of micro-controllers 100 make use of the circumstances that after a reset signal 114 the micro-controller 100 does not receive any data or program code from the main memory 150 during the first cycles of the reset signal. These clock cycles are not used in known micro-controllers. However, embodiments of the micro-controller 100 use these first clock cycles to execute one or more test instructions to check whether the micro-controller has been permanently manipulated by modifying signal paths or connections of signal paths of the micro-controller 100. Within this context, the term signal path refers to any signal path, and thus, includes for example control signal paths for the control signals 116, data signal paths 152, 154, address signal paths 158, 160, and further signal paths, for example, within the arithmetic logic unit 130.

The first jump operation, i.e. the selection itself of the address of the first instruction stored in the main memory for the normal operation via program counter PC and multiplexer MPX, forms a first sub-cycle of a first instruction cycle (I-cycle), whereas the reading or loading itself of the first instruction from the selected address of the main memory 150 to the instruction register IR via bus 152 forms a second sub-cycle of this first instruction cycle.

Depending on the application the processing unit is used for, a number n of clock cycles pass between the jump operation to the first instruction and the execution of the operations code of this first instruction once it is stored in the instruction register. In other words, n cycles pass for the reading operation itself.

In particular for chip cards with high security requirements, the decryption of encrypted data or instructions, e.g. stored in the main memory, increase the number of cycles passing between selecting an instruction and decoding the instruction for its execution.

Embodiments of the present invention use these clock cycles to perform a self test with regard to a manipulation of the processing unit or elements of the processing unit.

Embodiments of the micro-controller 100 comprise a storage element, for example, a stand-alone flip flop, a flip-flop of the status register, of the arithmetic logic unit, or any other register of the accumulator, a reset logic 111 adapted to store a test value in the storage element during the reset phase, and a control unit 110 to execute the test instruction, or a sequence of test instructions, using the test value after the reset phase. The reset logic can be part of the control unit 110, as shown in FIG. 1, but may also be a separate logic unit. The control unit 110 is further adapted to monitor a signal on a signal path and to detect that the micro-controller, and in particular the circuitry or signal paths of the micro-controller have been permanently manipulated in case an the aforementioned monitored signal of the micro-controller 100 maintains or assumes, due to the execution of the sequence of test instructions, a value that is different from an expected value, i.e. that is expected due to the test value and the execution of the sequence of test instructions. In other words, the signal is monitored on a signal path that somehow is linked to the storage element and/or depends on the test value stored in the storage element and on test instruction in case the micro-controller 110 has not been manipulated. A single test instruction can comprise a single test control signal or a sequence of test control signals, to one or several of the functional elements and registers of the micro-processor 110.

The reset signal 114 is generated, for example during power-up of the micro-controller and starts the reset phase or power-up phase. In case of chip cards, the reset is performed every time the chip card is, e.g., inserted into a contact based card reader, or activated from a contactless card reader via a radio frequency interface. The reset is performed each time before the any other read or write operation to the chip card can be performed.

In contrast to the execution of a program stored in the main memory 150 during a normal operation, the control unit of embodiments of the invention is adapted to execute the test instruction or sequence of test instructions independent, or in other words, without the use of the program counter 122. In other words, after the reset phase, the control unit 110 executes the test instruction, or sequence of test instructions, internally. Further embodiments may execute the sequence of test instructions independent of the instruction register, whereas other embodiments can be implemented to set one or several of the storage elements of the operations code part of the instruction register to prepare the processing unit for the execution of the test sequence. Even further embodiments can be adapted to set all storage elements of the operations code part of the instruction register according to an valid operations code, i.e. according to an operations code as used for the execution of programs stored in the main memory, and to decode the operations code to obtain the sequence of test instructions or test control signals.

Embodiments can be adapted to run a state machine right after the reset phase, e.g. a simple state machine in form of a cycle counter comprising flip-flops and logic gates, to control the execution of the sequence of test instructions.

Embodiments of the control unit 110 can be adapted to execute the test instruction or sequence of test instructions hardwired or hard coded. Control units 110 of such embodiments can, for example, comprise a logic gate connecting the clock signal 112 such with the hardwired control unit or state machine, that at each clock signal a control signal 116 of the sequence of test control signals or test instructions is generated. In other words, the execution of the sequence of test instructions is clocked by the clock signal 112.

Other embodiments of the control unit 110 can be adapted to execute the test instruction or sequence of test instructions in a micro-coded manner, for example, by using the state machine to select a specific entry within the micro-code memory at each clock signal 112 after the reset phase.

Embodiments of the control unit can be adapted to execute a sequence of test instructions such that at each test instruction of the sequence of test instructions a different storage element and associated signal path is tested, and the control unit is adapted to detect the manipulation in case an expected value does not appear at least once at each of the associated signal paths during the execution of the test instructions.

Embodiments of the control unit 110 can be adapted to execute the same test instruction several times, for example, by selecting a hardwired or micro-programmed instruction via a logic gate, wherein the test instruction is executed when the reset signal and the clock signal are applied to the logic gate.

Further embodiments of the control unit 110 can be adapted to execute a sequence of different test instructions, for example, by using state machines, logic gates and/or flip-flops to select a first test instruction at a first clock signal and a second test instruction at a second, for example, consecutive, clock signal when the reset signal 114 is applied to the control unit 110.

Furthermore, in embodiments of the micro-controller 100, at least one storage element is adapted to store a test value when the micro-controller 100 receives a reset signal 114. Similar to the known "reset" in the sense of storing the logic value "0" at the storage elements, when receiving the reset signal 114, a reset signal 114 can be directly connected to a set input port of the storage element respectively flip-flop (instead of the direct connection to the reset input port of the flip-flop). In other embodiments, the control unit 114 can be adapted to generate a control signal 116 that effects the storing of the test value in the storage element.

The direct setting, or in other words, storing of the test value in the storage element, avoids the necessity of implementing and/or executing such a set of instructions by the control unit 110.

In further embodiments, the control unit 110 is adapted to perform a sequence of test instructions such that after completion of the sequence, all storage elements store predefined values necessary for a consecutive execution of a micro-controller program using the program counter and/or the instructions register. Such embodiments can also be referred to as "self-repairing" as they repair the set state of the storage element during the execution of the test instructions by "resetting" the storage element as required for the consecutive normal operation of the micro-controller.

Figure 2:
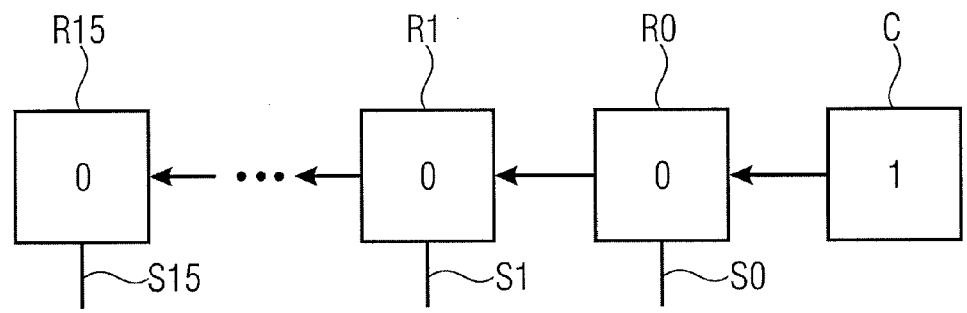
FIG. 2 shows an embodiment of a 16-bit arithmetic logic unit (ALU) with a set carry flag.

FIG. 2 shows a 16 bit arithmetic logic unit 130 with a carry storage element C also referred to carry flag C. The storage elements R0 to R15 of the arithmetic logic each represent a specific bit position. For illustrative purposes, FIG. 2 only shows the first or lowest significant bit R0, the second bit R1 and the sixteenth bit R15 that can also be referred to as most significant bit (MSB) of the arithmetic logic unit. Each of the 16 storage elements R0 to R15 comprises an output port to which a signal line or signal path S0 to S15 is connected. In the embodiment as shown in FIG. 2, the carry storage element C is set. In other words, it stores the binary test value "1". The storage elements R0 to R15 are reset, or in other words, store the binary reset value "0" as, for example, required for the normal operation. The carry storage element C has been set upon reception of the reset signal 114 as discussed before. The control unit 110 executes 17 times the "shift left" operation so that the value "1" shifts, for example, at a first clock cycle from carry storage element C to the first storage element R0, in a second clock cycle from the first storage element R0 to the second storage element R1, and so forth, until the binary value "1" is shifted to the 16th storage element R15 at the 16th clock cycle and is again shifted out of the storage element R15 at the 17th clock cycle. Thus, at each clock cycle, a different storage element R0 to R15 stores the test value "1". Thus, the expected signal value at the first signal path S0 connected to the first storage element R0 at the first clock cycle is "1", the expected value at the second signal path S1 connected to the second storage element R1 at the second clock cycle is 1 (for the other storage elements it is "0"), and so forth. In case, for example, signal path S1 has been connected permanently to a low voltage, for example, the logic value "0", the actual signal value "0" at the second clock cycle would defer from the expected signal value "1". Thus, by evaluating the actual signal, for example, by comparing the actual signal with an expected signal, the control unit 110 can detect the permanent manipulation of the second signal path S1.

In further embodiments, the arithmetic logic unit 130 can be implemented to insert "0"s when shifting the "1" from right to left so that after the seventeenth shift, the carry storage element and the register storage elements R0 to R15 are again in a reset state and, thus, are correctly initialized and ready for a consecutive normal operation of the micro-controller. Further embodiments may execute different shift operations, for example, shift with rotate, shift from left to right, etc. Another embodiment can be adapted to set, for example, the first storage element R0 upon reception of the reset signal 114 without using the carry storage element and to shift the logic value "1" from right to left, as previously described, to test the signal paths between the individual storage elements R0 to R15 of the register and the signal paths S0 to S15.

In another embodiment, the arithmetic logic unit 130 comprises a zero detector setting a zero-flag to the value "1", in case all storage elements R0 to R15 contain the value "0". If at least one of the storage element stores a "1", the zero-flag is reset to the value "0". The actually stored values of the register R0 to R15 are measured, e.g. via the corresponding signal paths S0 to S15. Thus, in an embodiment, wherein at each clock cycle only one of the storage elements R0 to R15 contains a logic value "1", whereas all other storage elements contain the logic value "0", and wherein the binary test value "1" is shifted through the arithmetic logic unit, the 0-detector—in case of no manipulation—does not detect at any of the clock cycles that all storage elements R0 to R15 are 0 (zero flag=0). If the zero-detector assumes the value "1" in one clock cycle, a permanent manipulation of at least one of the signal paths S0 to S15 and/or the signal paths between the storage elements R0 to R15 used for shifting is detected.

Put more general, the control unit 110 can adapted to execute the sequence of test instructions such that at each test instruction of the sequence of test instructions a different storage element and associated signal path is tested, and the control unit is adapted to detect the manipulation in case the expected value does not appear at least once at each of the associated signal paths during the execution of the test instructions. In further embodiments at each test instruction of the sequence of test instructions a different storage element is set to the test value. The control unit 110 can be adapted to execute the same test instruction, e.g. a shift instruction to shift the test value from a storage element to a next storage element, a predefined number of times, and each time using a different storage element of the processing unit. In a further embodiment, the test instruction is shift-with-carry instruction, wherein the storage element is the carry flag.

The control unit can be further adapted to execute the sequence of test instructions such that after successful completion of the sequence of test instructions, the storage element stores an initialization value that is different from the test value, wherein the initialization value is the value the storage element has to be reset to for a correct execution of a program based on the program counter, e.g. a program stored in a main memory 150.

The control unit can be adapted to stop the sequence of test instructions in case the control unit has detected a manipulation and to deactivate itself respectively the processing unit. Thus, e.g. a chip card comprising a manipulated micro controller cannot be used anymore. Fraud is prevented. For the same reason, the control unit can be adapted to activate itself respectively the processing unit only in response to the reset signal. In other words, embodiments of the control unit can be adapted to only load an instruction from an external main memory into an instruction register of the processing unit based on the program counter, in case the control unit detected no manipulation during the execution of the sequence of test instructions. Thus, once the control unit has detected a manipulation it deactivates the chip card, and as soon as an attempt is started to activate the chip card again, the control unit first performs the sequence of test instructions again, detects the manipulation again and immediately deactivates the chip card again. Therefore, further embodiments of the chip card do not comprise any means or external interface for bypassing this internal test procedure.

Figure 3:
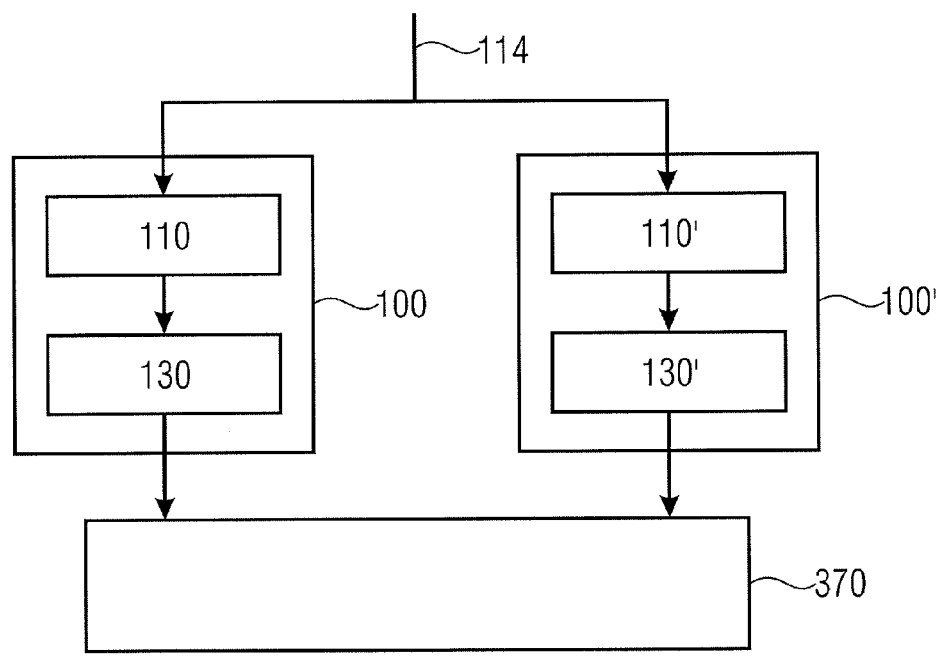
FIG. 3 shows an embodiment of a device with two processing units and a comparator.

FIG. 3 shows a device 300, for example, a chip card or a smart card, comprising a first micro-controller 100 and a second micro-controller 100', wherein the second micro-controller 100' shows basically the same features as the first micro-controller 100. The device 300 can comprise, e.g. a single common main memory shared by both micro-controllers.

In a normal operation both micro-controllers 100, 100' execute the same program code, for example, provided by the common main memory 150. This allows for the comparison of the results of the two micro-controllers 100, 100'. As both micro-controllers 100, 100' execute the program independently, volatile faults within the execution of the programs can be detected, and thus malfunctioning prevented. Embodiments of the device 300 can, for example, be implemented to repeat the program as a whole, or at least partly, in case such difference is detected by the comparator 370.

Embodiments 300 are adapted to use the comparator 370 also for the testing with regard to permanent manipulation of the device 300. For this purpose, the micro-controllers of the first and the second processing unit can be adapted to execute a sequence of instructions in parallel to allow for an easy comparison of the outputs generated by each of the two micro-controllers respectively processing units.

In one embodiment, both micro-controllers 100, 100' execute the same internal sequence of test instructions and check whether the comparator 370 detects a difference between the results of the two micro-controllers 100, 100'. In another embodiment, the first micro-controller 100 performs a shift operation with carry, as described based on FIG. 2, whereas the second micro-controller 100' performs a shift without carry. Thus, the result output by the arithmetic logic unit 130 of the first micro-controller 100 should defer at each cycle from the result output by the arithmetic logic unit 130' the second micro-controller 100'. Thus, control unit 100 and/or control unit 100' expect that the comparator 370 indicates a "fault" or in other words, a difference between the outputs of the two micro-controllers, and will detect a permanent manipulation, in case the comparator 370 does not indicate a fault.

In further embodiments of the device 300, the second processing unit can be a duplicate of the first processing unit, and the first and second test value can be equal and the first and second sequence of instructions can also be equal. In such embodiments the first control unit is adapted to detect the manipulation when the comparison signal indicates that the output of the first processing unit is different to the output of the second processing unit processing unit.

In other embodiments of the device 300, the first and second test values are different and the first and second sequence of instructions are equal. In such embodiments the first control 110 unit is adapted to detect the manipulation when the comparison signal indicates that the output of the first processing unit is equal to the output of the second processing unit. In a specific embodiment, the storage elements of the first and second processing unit can be, for example, carry flags, and the first control unit adapted to execute a shift with carry as first sequence of test instructions, whereas the second control unit is adapted to execute a shift without carry as second sequence of test instructions.

In further embodiments the first and second test value can be equal and the first and second sequence of instructions different, and the first control unit can be adapted to detect the manipulation in case the comparison signal indicates that the output of the first processing unit is equal to the output of the second processing unit processing unit.

The output of the first processing unit can, for example, be an output of an arithmetic logic unit of the first processing unit, and the output of the second processing unit an output of an arithmetic logic unit of the second processing unit.

In even further embodiments, the control unit 110 of the first processing unit can be adapted to generate a sequence completion signal after the first and second test sequence have been successfully completed, i.e. the control unit of the first processing unit did not detect a manipulation. In such embodiments the reset logic of the first processing unit can be adapted to set the storage element to the correct initialization value, in response to the sequence completion signal during the reset phase, and the control unit of the first processing unit can be adapted to execute in response to the sequence completion signal the same sequence of test instructions again independent of the program counter of the first processing unit, wherein the control unit of the first processing unit is adapted to execute the sequence of test instructions using the correct initialization value and in response to the sequence completion signal. On the other hand, in such embodiments the reset logic of the second processing unit can be adapted to set the storage element of the second processing unit to the test value in response to the sequence completion signal, and the control unit of the second processing unit can be adapted to execute the same sequence of test instructions again independent of the program counter of the second processing unit, wherein the control unit of the second processing unit is adapted to execute the sequence of test instructions using the test value and in response to the sequence completion signal. Such internal test procedures testing the two processing units 100 and 100' in two steps, i.e. using two consecutive test sequences, allow to detect manipulations that cannot be detected by only performing a single sequence of test instructions as described based on FIG. 1. Other embodiments can comprise other combinations of test values, including the initialization values, and sequences of test instructions for the first and second processing unit in the first test phase and in the second test phase.

The explanations with regard to the fraud protection, e.g. the deactivation of the processing unit or device, in case a manipulation has been detected, and other explanations made with regard to the processing unit 100 according to FIG. 1, are also valid for the above mentioned two or more processing unit embodiments.

To summarize the aforementioned, embodiments of the present invention provide an easy extension of the internal protection of micro-controllers, and in particular, security controllers. Embodiments use the circumstances that multiple system clock cycles, for example, sixteen clock cycles for the Infineon SLE 78 family, are available after the reset until the micro-controller receives first external data or code that it can execute. These clock cycles elapse unused in common systems, and are used by embodiments of the invention.

Thereto, the micro-controller or central processing unit (CPU) is brought knowingly into an illegal state by the reset and uses the clock cycles to check itself and to "repair" itself. This "illegal state" is called such as it is different from the "correct initialized state" known and required for starting the "normal operation", i.e. for starting the execution of the program stored in the main memory 150. The test values or test initialization values that are different to the correct initialization values are examples for such "illegal" or "erroneous" values or states.

Embodiments of the central processing unit can, for example, be adapted to check whether one of its sixteen bus signal lines has been permanently manipulated by sending a sequence of dummy-instructions or test instructions through the arithmetic logic unit, by which on each signal line a "1" is generated at least once, and checking at the same time whether this value is actually provided from the arithmetic logic unit. This check can, for example, be performed by a second central processing unit. The second processing unit can be adapted to calculate error free with a correct initialization, wherein the processor only starts in case errors are reported permanently during the initialization clock cycles. In case for one of the clock cycles no error is reported, any further execution is stopped.

In even other words, embodiments comprise a security check realized in hardware and performed at a time instance at which the system is not active. To exclude a manipulation, the system is knowingly initialized in an erroneous state. Only when the check sequence during the initialization is carried out successfully, a correct initialization is achieved and a system starts with first data or code sequences. Thus, embodiments provide a timing-neutral check that additionally tests the circuit and the error detecting circuit, for example the comparator. Furthermore, the system check is carried out before any manipulation on the system happened. Thus, it is secured that permanent errors are reliably detected at the actually earliest possible instant for the tested area.

An embodiment is a system with two central processing units 110, 110', wherein the program status words in both central processing units are initialized differently. The program status word (PSW) is a hardware register which contains information about the program state and can comprise a pointer or address to the next instruction to be executed, for example, similar to the program counter, and contains status information such as, for example, stored in the status register. The second CPU 110' receives the correct reset or initialization value, the first CPU 110 starts with an erroneous value different to the correct initialization value. Here, the carry is set during the reset. Afterwards, a sequence with "shift-with-carry" is executed. The erroneous value or test value is thereby sequentially shifted over the different signal lines of the bus. The result is compared with the result of the second CPU 110'. In each clock cycle, an error has to be indicated. The decoder processes the sequences only in case this error appears. Through the shift operation with carry the program status word "repairs" itself and comprises at the end of the sequence the correct initialization value in its registers. The execution of the codes, thus, starts with a correctly initialized system and only works, in case no errors appear on the error detection circuit. By means of this sequence, each permanent error on this signal line or circuit is detected.

In an alternative embodiment, a second CPU 110' is also tested by initializing also for this CPU the program status word carry flag with a wrong value. In this case, the second CPU 110' performs in a first sequence only shift instructions without consideration of the carry flag. After the check of the first CPU 110 has been terminated, the second sequence is executed on the system during which the second CPU 110' performs the shift with carry sequence, whereas the first CPU 110 performs a shift without carry sequence. Thus, permanent errors on the bus signal lines of the arithmetic logic units in both CPUs can be excluded. Such embodiments allow for the testing of the complete error detection circuit of the bus, including the compression for one signal alone. The effort to achieve a similarly high coverage for the error detection circuit is considerably higher for the user mode security life control.

In case, during the check, a permanent error is detected, the complete system is deactivated already prior to executing the first instruction. Embodiments do not require changing the system state. To exit the deactivated state, the card can only be brought in a reset, from which the initialization immediately starts again. This leads to a classic deadlock in the case of permanent errors. The attacker cannot use the card any further. Embodiments can therefore also be regarded as implementing "security check of microcontrollers during the startup phase of the system".

Summarizing the previous explanations, certain embodiments of the processing unit comprise a control unit adapted to execute after a reset phase a sequence of test instructions independent of a program counter and/or an instruction register of the processing unit, in other words internally, to detect a manipulation of the processing unit before the control unit decodes a first instruction for a normal operation, the first instruction being a first instruction of a sequence of instructions selected, e.g. from an external memory or any other external source, and read to the instruction register using a program counter or address field of the instruction register of the processing unit.

Put in different words, certain embodiments of the processing unit comprise a control unit adapted to execute after a reset phase and before a normal operation the sequence of test instructions independent of a program counter and/or an instruction register of the processing unit, in other words internally, to detect a manipulation of the processing unit before the control unit decodes a first instruction for the normal operation, the first instruction being a first instruction of a sequence of instructions selected, e.g. from an external memory or any other external source, and read to the instruction register using a program counter or address field of the instruction register of the processing unit.

Within this context the term "normal operation" refers to any software based operation or execution of any software based program, including the execution of a software based test program before executing other software programs. The software based test program and/or the other programs can, for example, be stored in the main memory 150 or any other external source. In contrast thereto, the execution of the sequence of test instructions for the detection of the manipulation according to certain embodiments of the invention is performed hardware based, e.g. by state machines, or in other words without using software based programs.

Considering the above, certain embodiments of the processing unit comprise a control unit adapted to execute after a reset phase a sequence of test instructions independent of a program counter and/or an instruction register of the processing unit, in other words internally, to detect a manipulation of the processing unit before the control unit decodes a first instruction, the first instruction being a first instruction of a sequence of instructions selected, e.g. from an external memory or any other external source, and read to the instruction register using a program counter or address field of the instruction register of the processing unit.

Although embodiments of the processing unit have been described based on a microcontroller according to FIG. 1 and devices 300 according to FIG. 3, other embodiments can comprise other types of processing units, micro-controllers or security controllers, with different control, bus and memory architectures, or different address and data bus widths. Further embodiments can use the binary value "1" as reset or initialization value and "0" as test value, wherein the test value of the storage element is different to an initialization or reset value of the storage element. Other embodiments of the micro-controller are adapted to distinguish not only an instruction cycle and an execution cycle for the execution of the whole instruction, but perform the cycles of instruction fetching (IF), instruction decoding (ID), execution (Ex), memory access (MEM) and write back (WB).

The reset logic 111 can be implemented using, e.g., logic gates and/or latches inside or outside of the control unit, although the reset logic is symbolically shown in FIG. 1 as part of the micro-controller 110.

In contrast to known solutions for testing processing units on permanent manipulation, embodiments require no or almost no additional signal paths and hardware. Embodiments using only one and the same test instruction several times, e.g. only a shift instruction for a predefined number of times, allow to keep the complexity of the test realization at a minimum. Furthermore, through the use of existing logics, e.g. the zero detector or the comparator in case of dual micro-controller devices, the complexity of the detection part of the test realization can also be kept at a minimum.

The initialization value is the value the storage element has to be reset to for a correct execution of a program based on the program counter, i.e. a program stored in a main memory. Embodiments of the internal testing can be adapted set one or more storage elements to a test value, the test value being different to the initialization value of the respective one or more storage elements.

Such external programs stored, for example in the main memory, are executed after a successful self-test based on one or more sequences of test instructions as described. For fraud prevention, the control unit can be further adapted to only load an instruction from the external main memory 150 into the instruction register 122 based on the program counter 120, in case the control unit 110 detected no manipulation during the execution of the sequence of test instructions.

Depending on certain implementation requirements of the inventive method, the inventive methods can be implemented in hard-ware or in software. The implementation can be performed using a digital storage medium, in particular a disc, compact disk (CD), or a digital versatile disc (DVD) having an electronically readable control signal stored thereon which cooperates with a programmable computer system such that an embodiment of the inventive method is performed.

Generally, an embodiment of the present invention is, therefore, a computer program product with a program coded stored on a machine-readable carrier, the program code being operative for performing the inventive methods when the computer program product runs on a computer. In other words, embodiments of the inventive methods are therefore, a computer program having a program code for performing at least one of the inventive methods when the computer program runs on a computer.

While the foregoing has particularly shown and described with reference to particular embodiments thereof, it is to be understood by those skilled in the art that various other changes in the form and details may be made, without departing from the spirit and scope thereof. It is therefore to be understood that various changes may be made in adapting to different embodiments without departing from the broader concept disclosed herein and comprehended by the claims that follow.

The invention claimed is:

1. A processing unit, comprising:
 a main memory storing a first instruction;
 wherein the processing unit is configured such that n clock cycles pass between a jump operation to the first instruction and the execution of an operations code of the first instruction once the first instruction is stored in an instruction register, wherein n is a number, and
 a control unit configured to execute after a reset phase during the n clock cycles a sequence of test instructions to detect a manipulation of the processing unit before the control unit decodes the first instruction,
 wherein the control unit is configured to execute the sequence of test instructions in a hard-wired or micro-coded manner independent of a program counter and an instruction register of the processing unit.

2. The processing unit according to claim 1, wherein the control unit is configured to that the processing unit has been manipulated in case a signal of the processing unit maintains or assumes a value that is different from an expected value.

3. The processing unit according to claim 2, comprising:
 a reset logic configured to set a storage element to a test value during the reset phase;
 wherein the control unit is configured to execute the sequence of tests instruction using the test value and to detect that the processing unit has been manipulated in case a signal of the processing unit, which depends on the test value of the storage element, maintains or assumes a value that is different from an expected value.

4. A processing unit according of claim 1, wherein the processing unit comprises a plurality of storage elements, and wherein, at each test instruction of the sequence of test instructions, a different one of the plurality of storage elements is set to a test value.

5. The processing unit according to claim 3, wherein the processing unit comprises a plurality of storage elements, and wherein the sequence of test instructions comprises executing the same test instruction a predefined number of times, and each time using a different one of the plurality of storage elements of the processing unit.

6. The processing unit according to claim 5, wherein the same test instruction is a shift instruction shifting the test value from one of the plurality of storage elements to a next one of the plurality of storage elements.

7. The processing unit according to claim 3, wherein the control unit is configured to execute a shift-with-carry instruction, and wherein the storage element is the carry flag.

8. The processing according to claim 1, wherein the processing unit is configured to detect whether all storage elements of a predefined set of storage elements of the processing unit store a first value, and wherein the control unit is configured to detect a manipulation in case the control unit detects at least once during the execution of the sequence of test instructions that not all storage elements of the plurality of storage elements store the first value.

9. The processing unit according to claim 3, wherein, after successful completion of the sequence of test instructions, the storage element stores an initialization value that is different from the test value, wherein the initialization value is the value the storage element has to be reset to for a correct execution of a program based on the program counter.

10. A method for testing a processing unit comprising a main memory storing a first instruction and a control unit, wherein the processing unit is configured such that n clock cycles passes between a jump operation to the first instruction and the execution of an operations code of the first instruction once the first instruction is stored in an instruction register, wherein n is a number, the method comprising:
 executing, by the control unit, a sequence of test instructions to detect a manipulation of the processing unit after the reset phase during the n clock cycles before decoding the first instruction,
 wherein the control unit is configured to execute the sequence of test instructions in a hard-wired or micro-coded manner independent of a program counter and an instruction register of the processing unit.

11. The method according to claim 10, wherein manipulation of the processing unit is detected in case a signal of the processing unit maintains or assumes a value that is different from an expected value.

12. The method according to claim 11, comprising:
 setting a storage element to a test value during the reset phase;
 wherein manipulation of the processing unit is detected in case a signal of the processing unit, which depends on the test value of the storage element, maintains or assumes a value that is different from an expected value.

13. A device comprising:
 a main memory storing a first instruction;
 a first processing unit and a second processing unit, wherein the first and second processing units are configured such that n clock cycles passes between a jump operation to the first instruction and the execution of an operations code of the first instruction once the first instruction is stored in an instruction register, wherein n is a number, the first processing unit comprising a first control unit, wherein the first control unit is configured to execute after a reset phase during the n clock cycles a first sequence of test instructions to generate an output;

the second processing unit comprising a second control unit, wherein the second control unit is configured to execute after a reset phase during the n clock cycles a second sequence of test instructions to generate an output; and a comparator, configured to compare the output of the first processing unit and the output of the second processing unit and to generate a comparison signal indicating, whether the output of the first processing unit is different to the output of the second processing unit;

wherein a manipulation of the first or second processing unit is detected, before the control unit of the first and/or second processing unit decodes the first instruction, based on a value of the comparison signal of the comparator, wherein the first and second control units are configured to execute the sequence of test instructions in a hard-wired or micro-coded manner independent of program counters and instruction registers of the first and second processing units.

14. The device according to claim 13, wherein the first processing unit comprises a first reset logic configured to set a storage element to a first test value during the reset phase, and wherein the first control unit is configured to execute the first sequence of test instructions after the reset phase using the first test value;

wherein the second processing unit comprises a second reset logic configured to set a storage element to a second test value during the reset phase, and wherein the second control unit is configured to execute the second sequence of test instructions after the reset phase using the second test value.

15. The device according to claim 14, wherein the first and second test values are equal and the first and second sequences of instructions are equal, and wherein a manipulation is detected in case the comparison signal indicates that the output of the first processing unit is different from the output of the second processing unit.

16. The device according to claim 14, wherein the first and second test values are different and the first and second sequences of instructions are equal, and wherein a manipulation is detected in case the comparison signal indicates that the output of the first processing unit is equal to the output of the second processing unit.

17. The device according to claim 14, wherein the storage elements of the first and second processing unit are carry flags, wherein the first control unit executes a shift with carry as first sequence of test instructions and the second control unit executes a shift without carry as second sequence of test instructions.

18. The device according to claim 14, wherein the control unit of the first processing unit is configured to generate a sequence completion signal after the first and second test sequences have been completed and if a manipulation has not been detected, wherein the reset logic of the first processing unit is a configured to set a storage element to the second test value in response to the sequence completion signal, and the control unit of the first processing unit is configured to execute, in response to the sequence completion signal and before decoding the first instruction for the normal operation, the second sequence of test instructions using the second test value; and wherein the reset logic of the second processing unit is configured to set the storage element of the second processing unit to the first test value in response to the sequence completion signal, and the control unit of the second processing unit is configured to execute, in response to the sequence completion signal and before decoding the first instruction for the normal operation, the first sequence of test instructions using the first test value.

19. The device according to claim 18, wherein the storage elements of the first and second processing unit are carry flags, wherein the first sequence of test instructions is a shift with carry and the second sequence of test instructions is a shift without carry.

20. A method for testing a device comprising a main memory, the method comprising:

providing the device comprising the main memory storing a first instruction, a first processing unit and a second processing unit, wherein the first and second processing units are configured such that n clock cycles passes between a jump operation to the first instruction and the execution of an operations code of the first instruction once the first instruction is stored in an instruction register, wherein n is a number, executing, by a first control unit of the first processing unit of the device, a first sequence of test instructions to generate a first output after a reset phase during the n clock cycles and before decoding the first instruction;

executing, by a second control unit of the second processing unit of the device, a second sequence of test instructions to generate a second output after a reset phase during the n clock cycles and before decoding the first instruction;

comparing the output of the first processing unit and the output of the second processing unit and to generate a comparison signal indicating, whether the output of the first processing unit is different to the output of the second processing unit; and detecting after the reset phase and before the processing units decode the first instruction for the normal operation that the first or second processing unit has been manipulated based on a value of the comparison signal, wherein the first and second control units are configured to execute the sequence of test instructions in a hard-wired or micro-coded manner independent of program counters and instruction registers of the first and second processing units.

21. The method according to claim 20, comprising:

setting a storage element of the first processing unit to a first test value during the reset phase;

executing the first sequence of test instructions after the reset phase independent of the program counter of the first processing unit using the first test value;

setting a storage element of the second processing unit to a second test value in response to the reset signal;

executing the second sequence of test instructions after the reset phase independent of the program counter of the second processing unit using the second test value.

* * * * *